United States Patent
Cady

[11] 3,890,201
[45] June 17, 1975

[54] MULTI-CHAMBER IMPEDANCE MEASURING MODULE-CAP COMBINATION

[75] Inventor: Paxton Cady, Los Altos Hills, Calif.
[73] Assignee: Bactomatic Inc., Palo Alto, Calif.
[22] Filed: Sept. 26, 1974
[21] Appl. No.: 509,669

[52] U.S. Cl. ............................... 195/127; 195/142
[51] Int. Cl. ............................................. C12b 1/00
[58] Field of Search .................... 195/127, 139, 142

[56] References Cited
UNITED STATES PATENTS
2,287,746  6/1942  Morton ............................... 195/139

*Primary Examiner*—Alvin E. Tanenholtz
*Attorney, Agent, or Firm*—Phillips, Moore, Weissenberger Lempio & Strabala

[57] ABSTRACT

The invention comprises a multi-chamber module-cap combination useful for measuring the impedance of samples of nutrient media in the chambers thereof, some of which samples include aerobic microorganisms. The module comprises a printed circuit board having a plurality of hollow cylinders upraised from one side thereof. The conductors of the circuitry provide a pair of spaced-apart contacts under each of the cylinders. The cylinders, before being sealed to the boards, are open at both ends so that the spaced-apart contacts are exposed within the chamber formed by the cylinders and the one side of the board. Caps are provided in combination with the board-cylinder structure, the caps serving to fit over the cylinders, the skirts of the caps being sufficiently long to extend against the one side of the board so that a gap exists between the tops of the caps and the tops of the cylinders. Interiorly of the skirts are a plurality of generally evenly spaced longitudinally placed upraised ribs. When the caps are pushed over the cylinders and down against the boards, the ribs engage the outer surface of the cylinders and an air flow channel is thereby provided from the interior of the chamber to the surrounding atmosphere, the channel being defined by the space between the cylinders, the skirt and the ribs.

3 Claims, 5 Drawing Figures

PATENTED JUN 17 1975 3,890,201

MULTI-CHAMBER IMPEDANCE MEASURING MODULE-CAP COMBINATION

BACKGROUND OF THE INVENTION

The invention relates to multi-chamber module-cap combinations useful for measuring the impedance of samples of nutrient media placed in the chambers thereof, some of which samples are inoculated to contain aerobic microorganisms, said measuring leading on a comparative basis to the identification of the particular aerobic microorganisms which are in the inoculated sample.

PRIOR ART

Multi-chamber modules are known, which are useful for measuring the impedance of nutrient media samples. Descriptions of typical prior art modules may be found in U.S. Pat. No. 3,743,581. Also, such modules are described in a paper entitled "Rapid Automatic Bacterial Identification By Impedance Measurements" presented by Dr. Paxton Cady to the International Symposium on Rapid Methods and Automation in Microbiology held at the Karolinska Institutet, Stockholm, Sweden, in June of 1973. Each of these prior art references discloses modules which operate with sealed-on caps, and inoculation of microorganisms therein generally proceeds by piercing the seals with hypodermic syringes or the like. While this is a sometimes advantageous manner of operation, especially when dealing with anaerobic microorganisms, it has now been found that when dealing with aerobic microorganisms it is necessary to provide a module which always maintains a gas flow channel between the insides of the chambers of the module and the external atmosphere while still fully and completely protecting the contents of the chambers from external and cross contamination. Such a channel is useful not only to allow the entrance of air into the chamber, which air is necessary for the aerobic growth of the microorganisms, but also allows for the escape of digestive waste product gases such as carbon dioxide, methane and the like, which may be produced by the microorganisms as they grow.

The prior art discloses a number of caps for use in fitting over test tubes and the like, which caps always maintain a gas flow channel to the external atmosphere, and further discloses that cultures of aerobic microorganisms can be grown inside of test tubes covered with such caps. Such caps for use with test tubes have, however, had skirts which are much shorter than the test tubes and have not been used in combination with multi-chamber modules or under conditions where they are snapped on completely over a cylinder and up against one side of a board.

Prior to the present invention, the prior art did not disclose the advantage attainable in providing multi-chamber module-cap combinations useful for measuring the impedance of samples of nutrient media, which caps, when in place over the chambers of said module, would constantly provide a channel from the interior of the chambers to the surrounding atmosphere, and are insertable fully over the chambers to fully protect the contents thereof from possible contamination and have skirts longer than the chambers so as to be snap fittable in place over the chambers and against the circuit board portion of said module.

It is accordingly an object of the present invention to provide in combination a multi-chamber module-cap combination, the caps being adapted to fit over the chambers thereof, each cap, when in place over a chamber, providing a channel from the interior of the chamber to the surrounding atmosphere so that air can enter into the chamber and gaseous waste products can exit from the chamber while said cap further fully protects the chamber from contamination, each of said caps being snap fittable over one of said chambers and up against a circuit board portion of said module.

SUMMARY OF THE INVENTION

The invention comprises a multi-chamber module-cap combination useful for measuring the impedance of samples of nutrient media in the chambers thereof, some of which samples include aerobic microorganisms therein. The multi-chamber module portion of the combination comprises a stiff flat electrically non-conductive board with a plurality of generally identical hollow cylinders open at both ends, each cylinder sealed at one end thereof to one side of said board to form a chamber, each cylinder extending to generally the same height from said one side of said board. The board includes a plurality of electrically conductive strips attached to said one side of said board, said strips providing a pair of spaced-apart contacts at the bottom of each of said chambers for measuring the impedance from one of said contacts to the other of a sample of nutrient medium therewithin. The strips further provide accessible portions thereof for connection to impedance-measuring circuitry. A plurality of caps made of a resilient material are provided. Each cap comprises a generally flat disc-like top, the diameter of the top being greater than the outer diameter of the cylinders. A skirt proceeding away from the top, generally perpendicularly thereto, circumferentially thereof, extends for a length greater than the height of the cylinder so that the top is prevented from sealing against the other end of the cylinder and so that the skirt extends at its bottom to abut against the one side of the board to fully prevent contamination of the contents of the chamber. The skirt includes internally thereof a plurality of generally evenly spaced ribs upraised therefrom, longitudinally thereof, the internal diameter of the skirt being slightly greater than the external diameter of the cylinder whereby when the cap is in place over the cylinder a press fit results between the ribs and the cylinder. Thereby a gas flow channel from the interior of the chamber to the surrounding atmosphere is provided as defined by the space between the cylinder, the skirt and the ribs.

BRIEF DESCRIPTION OF THE DRAWING

The invention will be better understood by reference to the drawing of the preferred embodiment of the invention, wherein.

DETAILED DESCRIPTION OF THE PREFERRED EMBODIMENT

Figure 1:
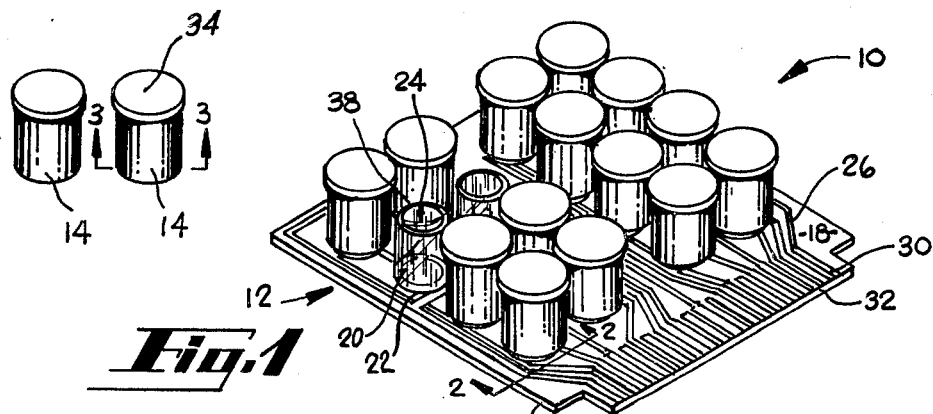
FIG. 1 illustrates in perspective a multi-chamber module for the invention with some of the caps thereof in position.

Referring now to the drawing wherein like numbers denote like parts throughout: The multi-chamber-cap combination of the invention is illustrated generally at 10. The combination includes generally the multi-chamber module portion 12 thereof in combination with the cap portion 14 thereof.

The module portion 12 includes the printed circuit board 16. Attached to the printed circuit board on one side 18 thereof are a plurality of open-ended hollow cylinders 20. The cylinders are affixed to the board at the one end 22 thereof with a sealant such as an epoxy resin or the like. A cylinder with the portion of the one side of the board which fits below it forms a chamber 24 into which samples of nutrient media, some of which samples include aerobic microorganisms, are placed. Each of the cylinders extends to the same height above the one side of the board.

Attached to the board 16 and more particularly to the one side 18 thereof are a plurality of conductor strips 26 generally formed of a non-reactive conductor such as gold, stainless steel or the like. The conductor strips 26 provide a pair of spaced apart contacts 28 at the bottom of each of the chambers 24 for measuring the impedance from one of the contacts to the other of a sample of nutrient material within the chamber. The strips further provide accessible portions 30 thereof for connection to impedance measuring circuitry. The accessible portions, in general, extend onto the tongue 32 which extends from the board.

Figure 2:
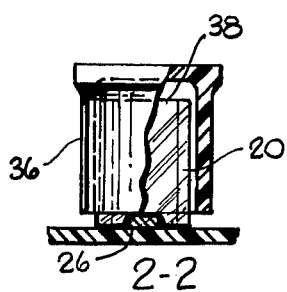
FIG. 2 comprises a view taken from the plane 2—2 of FIG. 1.
Figure 3:
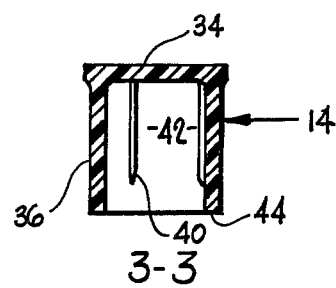
FIG. 3 illustrates in cross-sectional elevation a cap of the multi-chamber-cap combination.
Figure 4:
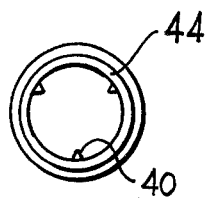
FIG. 4 illustrates in bottom view a cap of the combination.
Figure 5:
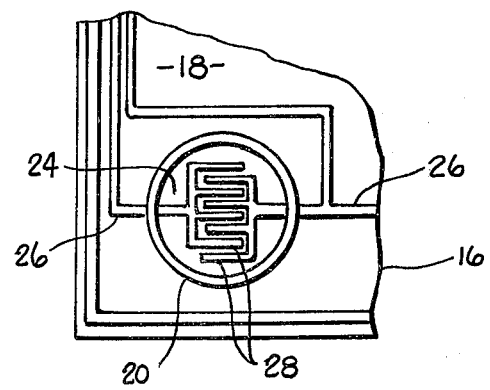
FIG. 5 illustrates a view taken downwardly into one of the chambers of the combination.

Reference most particularly to FIGS. 3 and 4 will better indicate the structure of the cap 14 of the preferred embodiment. The cap 14 includes a generally flat disc-like top 34, the diameter of the top being greater than the outer diameter of the cylinder 20. A skirt 36 proceeds away from the top generally perpendicularly thereto, circumferentially thereof. The length of the skirt is greater than the height of the cylinder so that the top is prevented from sealing against the other end 38 of the cylinder and so that the skirt extends against the one side of the board to fully prevent contamination of the contents of the chamber 24. The skirt includes internally thereof a plurality of ribs 40 upraised from the inside 42 thereof, the ribs being upraised therefrom longitudinally thereof and being generally evenly spaced from one another. The internal diameter of the skirt is slightly greater than the external diameter of the cylinder, and an internal diameter defined by the tops of the ribs is slightly less than the external diameter of the cylinder, whereby when the cap is in place over the cylinder a press fit results between the ribs and the cylinder and a gas flow channel from the interior of the chamber to the surrounding atmosphere is provided as defined by the space between the outer wall of the cylinder, the skirt and adjacent pairs of the ribs. The cap is of necessity made of a resilient material; generally a plastic. A relatively hard but resilient plastic such as polypropylene or polyethylene is preferred. When such a material is utilized there is sufficient resiliency for a good press fit to result between the ribs and the cylinder and the caps are hard enough to be reusable a number of times. Reference to FIG. 2 best illustrates the fitting of the cap 14 over the cylinder 20 so as to provide the necessary channel from the interior of the chamber 24 to the surrounding atmosphere.

Reference to FIGS. 2 and 3 illustrates the including of means upraised from the one side 18 of the board 16 for preventing the bottom 44 of the skirt from forming a gas-tight seal with the one side of the board. In the preferred embodiment, as illustrated, the means for preventing the forming of a gas-tight seal comprises using conductive strips 26 which are upraised slightly from the one side of the board.

In operation, the chambers 24 are each filled with a nutrient medium, generally two chambers for each particular medium used. A microorganism is inoculated into one of each pair of chambers which includes the same nutrient medium. This is accomplished by simple pipetting of the like with no need for insertion of a hypodermic syringe or the like through the cap 14. The caps are then snapped down over the cylinders 20 and up against the one side 18 of the board 16. This can be done in a firm and positive manner and without fear of damaging the cylinders or the board since the bottoms 38 of the skirts 36 of the caps abut the board when pushed in place as far as possible, but are kept from forming a gas-tight seal by the upraised strips 26.

The board is then inserted into an incubator wherein the tongue 32 is placed in a receptacle therefor thus connecting the accessible portion 30 of the conductor strips 26 to impedence-measuring circuitry. Because of the geometry of the board, each multi-chamber module-cap combination 10 is very box-like in shape and thus a number of such combinations can be stacked one on top of the other within a single incubator, thus allowing the processing of a large number of samples at the same time. Generally, relatively small cylinders are used, the total volume of the chambers being only about 2 cc and, generally, only about 1cc of nutrient medium is placed in each chamber 24. When such small chambers are used, the entire height of the combination from the bottom of the board 16 to the top 34 of the cap 14 is less than about one inch and a half.

While the invention has been described in connection with specific embodiments thereof, it will be understood that it is capable of further modfication, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the apended claims.

What is claimed is:

1. A multi-chamber module-cap combination useful for measuring the impedance of samples of nutrient media in the chambers thereof, some of which samples include aerobic microorganisms therein, comprising, in combination:

a stiff, flat, electrically non-conductive board;

a plurality of identical hollow cylinders open at both ends, each of said cylinders sealed at one end thereof at one side of said board to form a chamber, each cylinder extending to generally the same height from said one side of said board;

a plurality of electrically conductive strips attached to said one side of said board, said strips providing a pair of spaced-apart contacts under each of said chambers for measuring the impedance from one of said contacts to the other of a sample of a nutrient medium therewithin, said strips further providing accessable portions thereof for connection to impedance-measuring circuitry; and a plurality of caps made of a resilient material adapted to fit over said cylinders, each cap comprising a generally flat disc-like top, the diameter of said top being greater than the outer diameter of said cylinder, and a skirt proceeding away from said top generally perpendicularly thereto circumferentially thereof, the length of said skirt being greater than the height of said cylinder so that when said cap is fitted over said cylinder said top is prevented from sealing against the other end of said cylinder and said skirt extends against said one side of said board to prevent contamination of said chamber, said skirt including internally thereof a plurality of ribs upraised therefrom generally evenly spaced from one another longitudinally thereof, the internal diameter of said skirt being slightly greater than the external diameter of said cylinder and an internal diameter defined by the tops of said ribs being slightly less than the external diameter of said cylinder, whereby when said cap is in place over said cylinder a press fit results between said ribs and said cylinder and a gas flow channel is provided from the interior of said chamber to the surrounding atmosphere, as defined by the space between said cylinder, said skirt and said ribs and means for preventing the bottom of said skirt from forming a gas-tight seal with said one side of said board.

2. A module combination as in claim 1, wherein said conductive strips are upraised slightly from said one side of said board to prevent the bottom of said skirt from forming a gas-tight seal with said one side of said board.

3. A module combination as in claim 1, wherein said caps are made of a plastic material.

* * * * *